Figure 1:
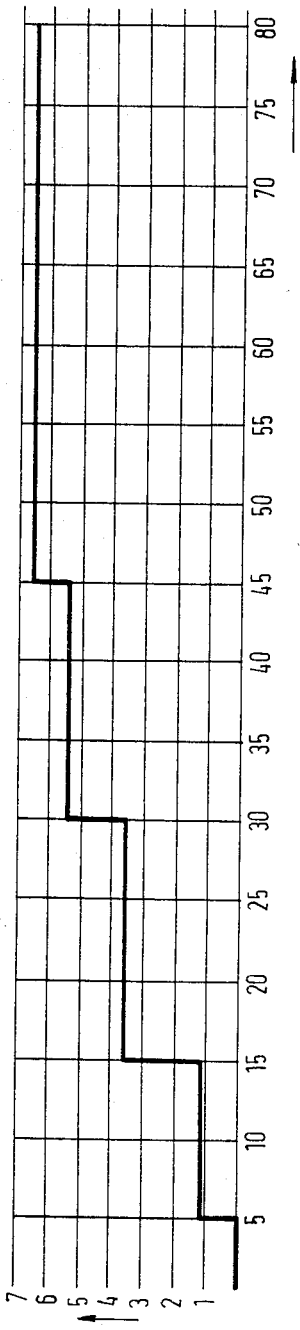

United States Patent [19]

van der Velde et al.

[11] Patent Number: 4,537,787

[45] Date of Patent: Aug. 27, 1985

[54] METHOD OF PREPARING A PRESSED CHEESE CURD HAVING A CLOSED RIND

[75] Inventors: Ype Y. van der Velde, Wommels; Jan Zantinge, Drachten, both of Netherlands

[73] Assignee: Tebel Machinefabrieken B.V., Netherlands

[21] Appl. No.: 532,690

[22] Filed: Sep. 16, 1983

Related U.S. Application Data

[63] Continuation of Ser. No. 306,898, Sep. 29, 1981, abandoned.

[30] Foreign Application Priority Data

Oct. 6, 1980 [NL] Netherlands .......................... 8005516

[51] Int. Cl.$^3$ .............................................. A23C 19/02
[52] U.S. Cl. .................................... 426/478; 100/110; 100/116; 426/491; 426/512
[58] Field of Search ............... 426/491, 478, 512, 515, 426/517, 414, 36; 99/460, 456, 464, 465; 100/37, 107, 110, 116; 425/84

[56] References Cited

U.S. PATENT DOCUMENTS

| | | | |
|---|---|---|---|
| 2,492,878 | 12/1949 | Miollis | 99/456 |
| 2,796,351 | 6/1957 | Walter et al. | 426/36 |
| 3,355,805 | 12/1967 | Krueger et al. | 425/84 |

FOREIGN PATENT DOCUMENTS

| | | | |
|---|---|---|---|
| 1285162 | 8/1972 | United Kingdom | 99/460 |
| 1423957 | 2/1976 | United Kingdom | |

*Primary Examiner*—George Yeung
*Attorney, Agent, or Firm*—Scully, Scott, Murphy & Presser

[57] ABSTRACT

A method of making a pressed curd having a closed rind by introducing curd in a cheese mould and pressing same with timed pressure variations, with separation of whey. According to the invention the curd in the cheese mould is subjected to a pressing cycle of intermittent pressing operations, whereby pressure is exerted on the curd in a number of periods, alternated by pressureless periods.

2 Claims, 3 Drawing Figures

METHOD OF PREPARING A PRESSED CHEESE CURD HAVING A CLOSED RIND

This is a continuation of application Ser. No. 306,898, filed on Sept. 29, 1981, now abandoned.

The invention relates to a method of preparing pressed curd having a closed rind for introducing curd in a cheese mould and pressing same with timed pressure variations and with separation of whey.

In the preparation of cheeses having rinds it is known within the scope of the cheese making process, to distribute the curd formed from the entire milk batch over a number of cheese moulds in which it is subjected to varying pressure with the whey being separated and discharged. Although the pattern of pressure variation during the pressing operation depends on the type of cheese being made, the practice followed therefor is that in a pressing cycle with a total duration of e.g. approximately 90 minutes, the pressure is increased step-wise in a number of consecutive stages.

In view of the increasing need in cheese factories to increase the production capacity, whether or not in combination with an advanced mechanization of the cheese making process, pressing apparatus have been designed whereby all curd obtained from a milk batch, distributed over e.g. 100 cheese moulds, is simultaneously subjected to the pressing operation. Such a pressing apparatus in the form of a pressing tunnel is provided with a sloping pressing floor comprising a cheese mould supply end and a discharge end, and which is made e.g. of a stainless steel plate above which the press dies are arranged according to a regular pattern, e.g. in the first mentioned case of 100 moulds to be subjected simultaneously of the pressing operation, according to a pattern consisting of 20 successive rows of 5 press dies each. The operation of the prior art pressing tunnel is based on the principle that first all rows of cheese moulds—i.e. 20 rows of 5 cheese moulds each—are positioned within the pressing tunnel by means of an incremental transport system underneath the correspondingly arranged press dies, after which the press dies are lowered under e.g. hydraulic or pneumatic control and the curd in each cheese mould is individually pressed. The pressing apparatus is provided with control means through which the pressure during the pressing cycle is centrally increased stepwise in consecutive stages. The duration of such a press cycle is normally about 90 minutes. After termination of the pressing cycle, the cheese moulds are discharged from the pressing apparatus row by row by means of the stepwise operating transport system.

It is the object of the invention to provide a method of the above described type, providing an increased pressing output per unit of time without adversely affecting the quality of the eventual cheese product.

According to the invention the procedure is followed that the curd in the cheese mould is subjected to a pressing cycle of intermittent pressing operations, whereby pressure is exerted on the curd in a number of periods, alternated by pressureless periods.

It has surprisingly been found that the intermittent pressure of the curd in the cheese mould according to the invention leads to a substantial reduction of the duration of the pressing cycle which, related to the same quantity of pressed-out whey, may be about 40% shorter than with the conventional method wherein the curd in the cheese moulds is constantly under a stepwise increased pressure during the entire pressing cycle.

The intermittent pressing operation according to the invention is excellently suitable for being performed with the above-described known pressing tunnel, to which the cheese moulds are supplied in rows via a conveyor belt and are transported stepwise in the pressing apparatus to the places where they are pressed individually but all simultaneously. The method according to the invention may be performed in such a way that after the admission to the pressing apparatus of the first row of cheese moulds supplied in successive rows, these are subjected to the pressing operation for the contemplated period of time, while the pressureless period to be maintained thereafter is allowed to coincide with the period required for moving up said first row of moulds with the conveyor provided for the purpose, by one increment in the transport direction, while simultaneously the places of the first row are taken by a next row of moulds. When in this way, the second and first rows of places within the pressing tunnel are taken by moulds these are subjected to the next pressing operation, i.e. the second row for the second time, the first row, however, for the first time, etc. In this manner the production capacity of the pressing apparatus is substantially increased. In view of the above and in connection with the fact that a regular alternation of pressing period and pressureless period is simplest in the overall cheese-making process and for the flow pattern used therein, the method according to the invention is preferably so carried out that pressing periods of substantially equal duration are alternated with pressureless periods of mutually equal duration, which is or is not equal to the duration of the pressing periods, and in particular the duration of the pressing periods is equal to the duration of the pressureless periods.

It has been experimentally found that in respect of the whey separation during the pressing of the curd present in a cheese mould, it is undesirable in connection with an adverse effect on the output of the pressure cycle, to choose the pressure in one pressing period lower than that in the preceding pressing period. Accordingly, in a further elaboration of the method according to the invention it is ensured that within the pressing cycle the pressure during one pressing period is not chosen lower than the pressure during the preceding pressing period. It is advantageous if the procedure thereby is such that within the pressing cycle, the pressure, per number of successive pressing periods of equal pressure, is increased.

The method according to the invention is suitable for making all kinds of cheese for which rind formation is necessary, e.g. the following semi-hard and hard kinds of cheese:

Gouda and Edam type, both round and in block-shape, the cheese being plasticized or packaged in foil;
Emmenthaler, Jarlsberg and Leerdam, Gruyère;
Cheddar and Cheddar-like cheeses;
Granular cheeses, Tilsiter, Havarti, Svecia;
St. Paulin, Trappist cheese, Port Salut;
Fontina, Danbo, Asiago, Cantal, Appenzeller;
Danablue, Stilton.

As advantages of the method according to the invention can be mentioned inter alia, in summary:

quicker whey separation from the curd block and as a result substantial reduction of the effective pressing time by about 40% or even more;

upon application of the prior art pressing tunnel, owing to the reduction of the effective pressing time, a higher production capacity is realized, so that with a desired cheese output per unit of time, a smaller pressing tunnel and fewer cheese moulds may be sufficient, which enhances the process economy;

less difference in the chemical condition of the various curd blocks in the pressing process during the pressing cycle by virtue of the fact that pressing per row, according to the invention, in the pressing tunnel instead of pressing after the entire pressing tunnel has been filled with moulds, does not result in a substantial time difference between the first row of cheese moulds admitted to the pressing tunnel and situated at the pressing tunnel discharge end and the last row of cheese moulds positioned at the supply end of the pressing tunnel.

Of great importance is that the above advantages are achieved without affecting the quality of the cheese produced.

The invention is illustrated in and by the following example.

EXAMPLE

A. Comparison test: preparation of a Gouda cheese with continuous pressing and at a stepwise increasing pressure.

A Gouda cheese of 12 kg was made; a curd block was pressed in a cheese mould according to the conventional method by continuously subjecting the curd block to a pressure. The pressure profile applied thereby is shown in FIG. 1. In FIG. 1 the pressure is plotted along the Y-axis in bars and the time along the X-axis in minutes.

The whey separation was about 355 cm$^3$ after a pressing period of 80 minutes.

B. Preparation of a Gouda cheese through application of the method according to the invention.

Again a Gouda cheese of 12 kg was made. The curd block disposed in the cheese mould of the same type as the one of the comparison test was exposed to a pressing schedule as represented in FIG. 2a wherein again the pressure is plotted in bars on the Y-axis and the time in minutes on the X-axis.

Figure 2:
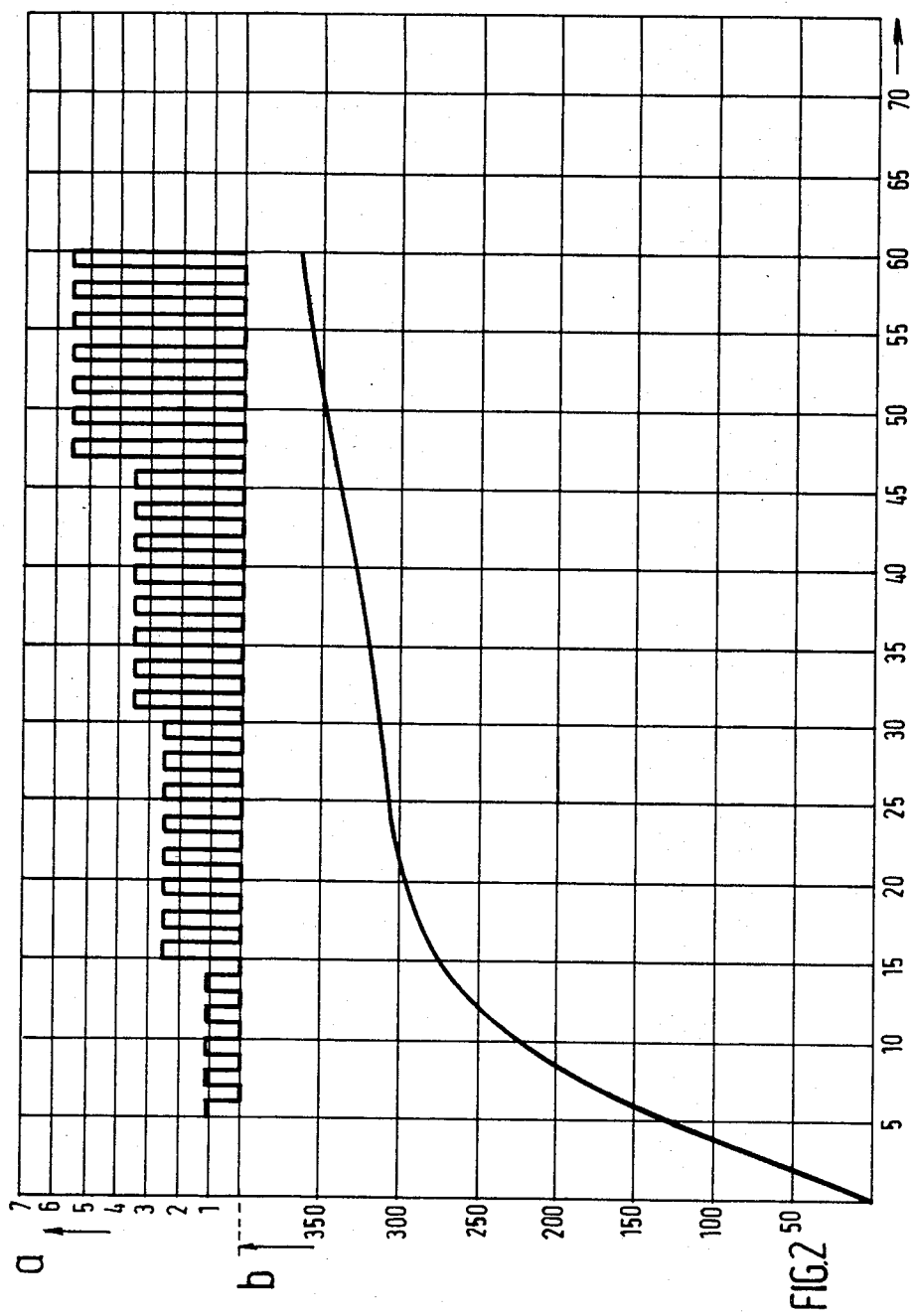

FIG. 2a shows that, after a pressureless preliminary phase of 5 minutes, the pressing cycle was begun with a pressing period of 1 minute and a pressure of 1 bar, followed by a pressureless period of 1 minute and so on for a total period of 10 minutes, comprising 5 pressing periods and 5 pressureless periods, after which the pressure in the next period of 8 pressing periods, alternated by likewise 8 pressureless periods, was increased by 2.5 bars. The pressure was increased a further two times in an analogous manner.

The whey separation occurring during this test is diametrically shown in FIG. 2b, wherein similarly to FIG. 2a, the time in minutes is plotted on the X-axis and the separated quantity of whey is plotted in cm$^3$ on the Y-axis.

FIG. 2b shows that in this embodiment of the method according to the invention, a quantity of separated whey of about 355 cm$^3$ had already been obtained after a pressing period of about 53 minutes. After a pressing period of 60 minutes the separated quantity of whey was about 365 cm$^3$.

C. Preparation of Gouda cheese through application of the method according to the invention but with a pressure distribution deviating from B.

Figure 3:
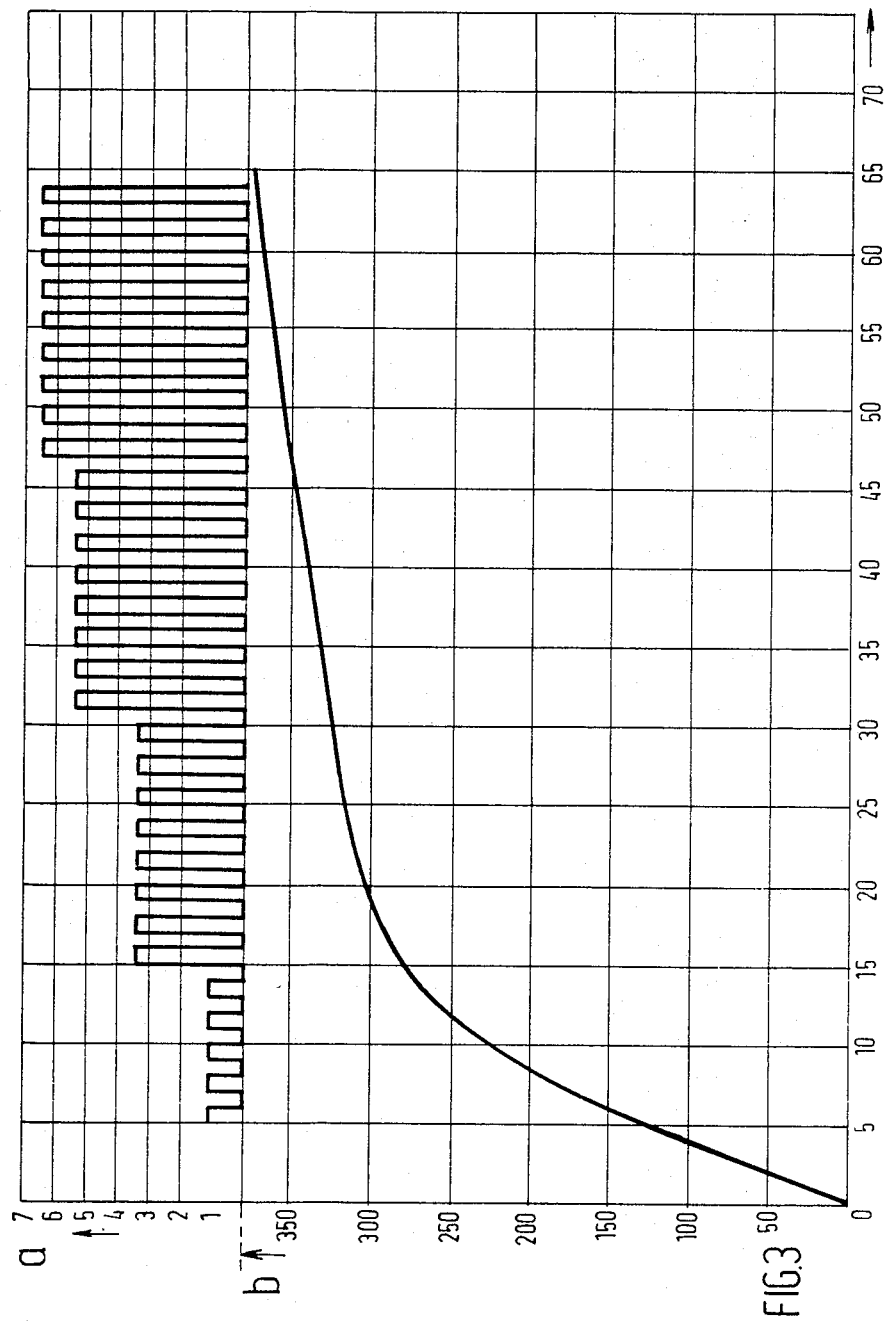

Analogously to the test described under B in the above, a Gouda cheese of 12 kg was made, during which, however, pressing took place with a pressing schedule as represented in FIG. 3a and wherein substantially higher pressure levels were employed.

The variation of the whey separation is shown in FIG. 3b analogously to FIG. 2b. FIG. 3b shows that a whey separation of 355 cm$^3$ was attained after about 48.5 minutes. After a pressing period of 65 minutes, the separated quantity of whey was even about 375 cm$^3$.

Accordingly tests B and C show the substantial reduction in pressing period in comparison with that according to comparative test A. The quality of the product obtained according to tests B and C was at least equivalent to that obtained according to comparative test A.

What we claim is:

1. In a method of making a pressed curd having a closed rind which includes introducing curd into a cheese mold and subjecting said curd to a pressing cycle having a plurality of pressing operations thereby separating whey from curd, the improvement comprising subjecting said curd to stages of increased pressure wherein at least one of said stages has pressure periods of substantially equal duration and equal pressure throughout said pressure periods alternated with pressureless periods of substantially equal duration throughout said pressureless periods and wherein the pressure exerted during each successive stage of said pressing cycle is increased.

2. A method according to claim 1 wherein the pressing cycle is performed in a pressing apparatus with pressing positions arranged in rows, said apparatus being provided with a conveyor system to transport the cheese molds in a stepwise manner such that each successive row is subjected to the pressure period of the pressing operation for the contemplated period of time and such that the pressureless period maintained thereafter is made to coincide with the time required for simultaneously moving the successive row into the pressing position.

* * * * *